United States Patent
Nam et al.

(10) Patent No.: US 11,516,680 B2
(45) Date of Patent: Nov. 29, 2022

(54) TECHNIQUES FOR INDICATING DIRECTIONAL INFORMATION FOR WIRELESS COMMUNICATIONS

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Xiaoxia Zhang, San Diego, CA (US); Sungwoo Park, Seoul (KR); Akula Reddy, San Diego, CA (US); Ahmed Abdelaziz Ibrahim Abdelaziz Zewail, San Diego, CA (US); Zhifei Fan, San Diego, CA (US); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/089,452

(22) Filed: Nov. 4, 2020

(65) Prior Publication Data

US 2021/0144564 A1 May 13, 2021

Related U.S. Application Data

(60) Provisional application No. 62/932,439, filed on Nov. 7, 2019.

(51) Int. Cl.
*H04W 16/28* (2009.01)
*H04W 72/04* (2009.01)
(Continued)

(52) U.S. Cl.
CPC .......... *H04W 16/28* (2013.01); *H04B 7/0626* (2013.01); *H04L 5/0051* (2013.01);
(Continued)

(58) Field of Classification Search
None
See application file for complete search history.

(56) References Cited

U.S. PATENT DOCUMENTS

2018/0343653 A1 11/2018 Guo
2018/0368115 A1* 12/2018 Li ...................... H04W 72/042
(Continued)

OTHER PUBLICATIONS

Interdigital Inc: "On Configuration of GC-PDCCH for Dynamic SFI", 3GPP, 3GPP TSG RAN WG1 Meeting #91, Tdoc: R1-1720637, Reno, USA, Nov. 27-Dec. 1, 2017, Dec. 1, 2017, 6 Pages, XP051370101, Retrieved from the Internet: URL: http://www.3gpp.org/ftp/tsg%5Fran/WG1%5FRL1/TSGR1%5F91/Docs/. [retrieved on Nov. 18, 2017] the whole document.
(Continued)

*Primary Examiner* — Otis L Thompson, Jr.
(74) *Attorney, Agent, or Firm* — Qualcomm Incorporated

(57) ABSTRACT

Some aspects described herein relate to receiving, in a configuration, a slot format indication, wherein the slot format indication includes directional information indicating spatial directions associated with communications based on the slot format, determining, for a slot indicated by the slot format indication and based on the directional information, the spatial direction, and communicating, within the slot and based on the spatial direction, with one or more nodes.

30 Claims, 6 Drawing Sheets

(51) Int. Cl.
    *H04W 56/00*     (2009.01)
    *H04B 7/06*     (2006.01)
    *H04L 5/00*     (2006.01)
    *H04W 76/27*     (2018.01)
    *H04W 80/02*     (2009.01)
    *H04W 74/08*     (2009.01)
    *H04L 25/02*     (2006.01)

(52) U.S. Cl.
    CPC ....... *H04L 25/0226* (2013.01); *H04W 56/001* (2013.01); *H04W 72/042* (2013.01); *H04W 72/046* (2013.01); *H04W 72/0446* (2013.01); *H04W 72/0493* (2013.01); *H04W 74/0833* (2013.01); *H04W 76/27* (2018.02); *H04W 80/02* (2013.01)

(56) References Cited

U.S. PATENT DOCUMENTS

2019/0222449 A1*   7/2019   Subramanian ........ H04L 5/0048
2020/0403689 A1*  12/2020  Rofougaran ........ H04W 52/245
2021/0235491 A1*   7/2021   Iyer ................... H04W 74/0808
2022/0022054 A1*   1/2022   Zhou ..................... H04W 16/28
2022/0109998 A1*   4/2022   Wei ....................... H04W 16/10

OTHER PUBLICATIONS

International Search Report and Written Opinion—PCT/US2020/059138—ISA/EPO—Feb. 5, 2021.

* cited by examiner

TECHNIQUES FOR INDICATING DIRECTIONAL INFORMATION FOR WIRELESS COMMUNICATIONS

CLAIM OF PRIORITY UNDER 35 U.S.C. § 119

The present application for patent claims priority to Provisional Patent Application No. 62/932,439, entitled "TECHNIQUES FOR INDICATING DIRECTIONAL INFORMATION FOR WIRELESS COMMUNICATIONS" filed Nov. 7, 2019, which is assigned to the assignee hereof and hereby expressly incorporated by reference herein for all purposes.

BACKGROUND

Aspects of the present disclosure relate generally to wireless communication systems, and more particularly, to communicating using directional information for communicating in spatial directions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, nodes communicating with one another can beamform communications such to transmit signals in certain spatial directions and/or receive signals in certain spatial directions to improve hearability and/or quality of the communications. For example, the nodes can apply a beamforming matrix to selectively apply power to antenna resources to obtain the spatial direction for transmitting and/or receiving signals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving, in a configuration, a slot format indication, wherein the slot format indication includes directional information indicating spatial directions associated with communications based on the slot format, determining, for a slot indicated by the slot format indication and based on the directional information, the spatial direction, and communicating, within the slot and based on the spatial direction, with one or more nodes.

In another example, a method of wireless communication is provided that includes generating a configuration including a slot format indication, wherein the slot format indication includes directional information indicating spatial directions associated with communications based on the slot format, transmitting the configuration to one or more nodes, and communicating, with the one or more nodes, wireless communications in a slot based on the directional information indicated in the configuration.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For example, in an aspect, an apparatus for wireless communication is provided that includes a transceiver, a memory configured to store instructions, and one or more processors communicatively coupled with the transceiver and the memory. The one or more processors are configured to receive, in a configuration, a slot format indication, wherein the slot format indication includes directional information indicating spatial directions associated with communications based on the slot format, determine, for a slot indicated by the slot format indication and based on the directional information, the spatial direction, and communicate, within the slot and based on the spatial direction, with one or more nodes.

In another aspect, an apparatus for wireless communication is provided that includes a transceiver, a memory configured to store instructions, and one or more processors communicatively coupled with the transceiver and the memory. The one or more processors are configured to generate a configuration including a slot format indication, wherein the slot format indication includes directional information indicating spatial directions associated with communications based on the slot format, transmit the configuration to one or more nodes, and communicate, with the one or more nodes, wireless communications in a slot based on the directional information indicated in the configuration.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
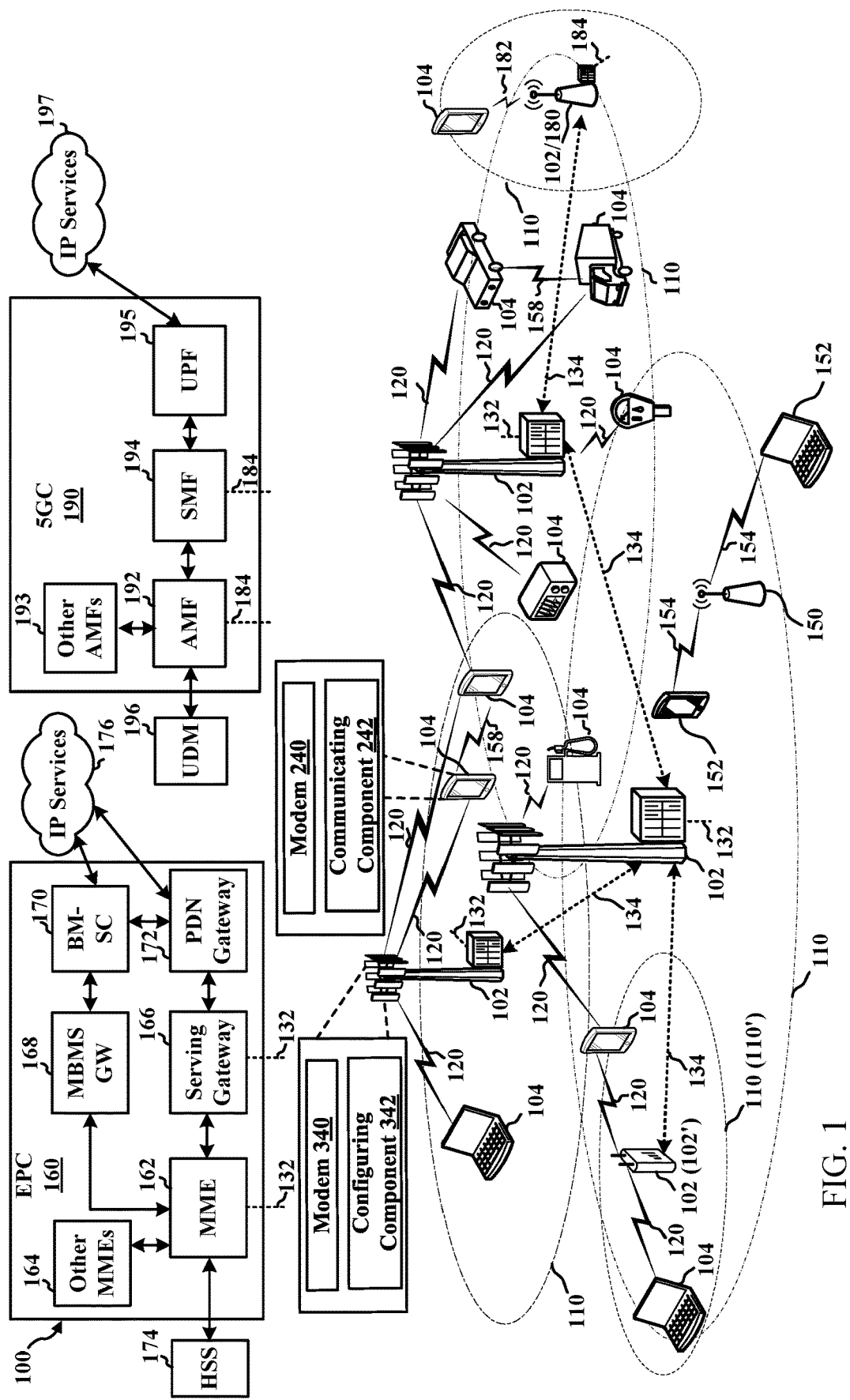
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to associating directional information indicating spatial direction for wireless communication along with a configuration related to communication format. For example, the configuration related to the communication format may indicate an assignment of time-division resources as being for certain types of communications (e.g., downlink, uplink, etc.). This can allow one node to configure another node to communicate therewith based on the communication format. In addition, the directional information included with, or otherwise associated with, the communication format can indicate information regarding a spatial direction to use in communicating during the time-division resources. For example, the information may include a beamforming matrix to use in beamforming antenna resources of the node to transmit and/or receive communications, or may include an indication of a signal based on which to beamform antenna resources (e.g., using beam reciprocity).

In some wireless communications, such as in third generation partnership project (3GPP) long term evolution (LTE), fifth generation (5G) new radio (NR), etc., wireless communication resources are divided into portions of frequency over time. The division of time resources can include symbols, such as orthogonal frequency division multiplexing (OFDM) symbols, where a number of adjacent symbols in time can be associated as a slot. In some examples, a slot can include 14 OFDM symbols (e.g., in normal cyclic prefix (CP)). In any case, a base station can transmit one or more configurations that indicate whether a symbol of a slot (or multiple symbols of a slot) are configured as a downlink symbol for downlink communications, an uplink symbol for uplink communications, or a flexible symbol for further configuration as a downlink symbol or an uplink symbol. In an example, the one or more configurations can also include the directional information, which may be specified per slot, per symbol of the slot, per type of communication (e.g., downlink or uplink), and/or the like. A user equipment (UE) receiving the configuration can accordingly determine the slot format and also the directional information to use in communicating, according to the slot format, over one or more symbols in the slot.

Indicating directional information with the slot format in this regard may allow for more accurate directional information for a UE to use in communicating with the base station, as UE mobility may cause change in optimal directional information/beams to be used by the UE and/or base station in communicating with one another. Indicating the directional information with the slot format may also save from overhead associated with semi-static and/or dynamic reconfiguration of directional information.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining directional information related to time-division resources (e.g., to a slot and/or one or more symbols of a slot, etc.) and communicating during the time-division resources based on the directional information. In addition, some nodes may have a modem 340 and configuring component 342 for configuring directional information for time-division resources, as described herein. Though a UE 104 is shown as having the modem 240 and communicating component 242 and a base station 102 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of UE 104 can determine directional information associated with time-division resources for communicating with a base station 102 (or other nodes, such as one or more other UEs), and can communicate with the base station 102 (or other nodes) based on the directional information at least during the associated time-division resources. For example, configuring component 342 of a base station 102 can configure the directional information for the time-division resources, as described further herein, which can include configuring directional information per slot format to apply to one or more slots, one or more symbols of the slot, etc., and the communicating component 242 can accordingly determine directional information for the slot and/or symbol. The directional information can include information for determining a spatial direction for antenna resources at the UE 104 to optimize transmitting signals to, or receiving signals from, the base station 102. Indicating the directional information for the slot or symbol (or other time-division) can allow for more frequent changing of the directional information, such to account for mobility of the UE in one example.

Figure 2:
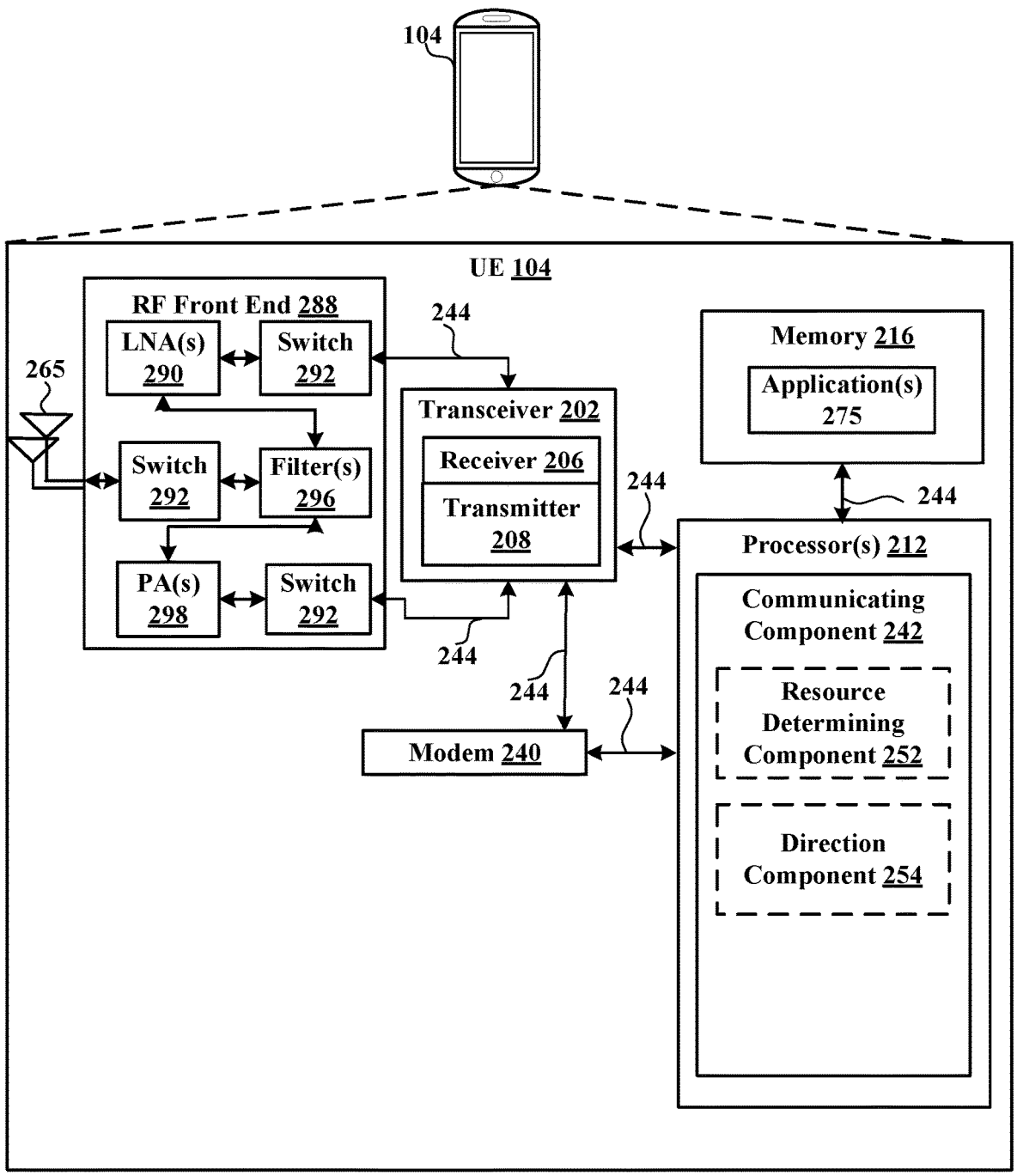
FIG. 2 is a block diagram illustrating an example of a UE, in accordance with various aspects of the present disclosure.
Figure 3:
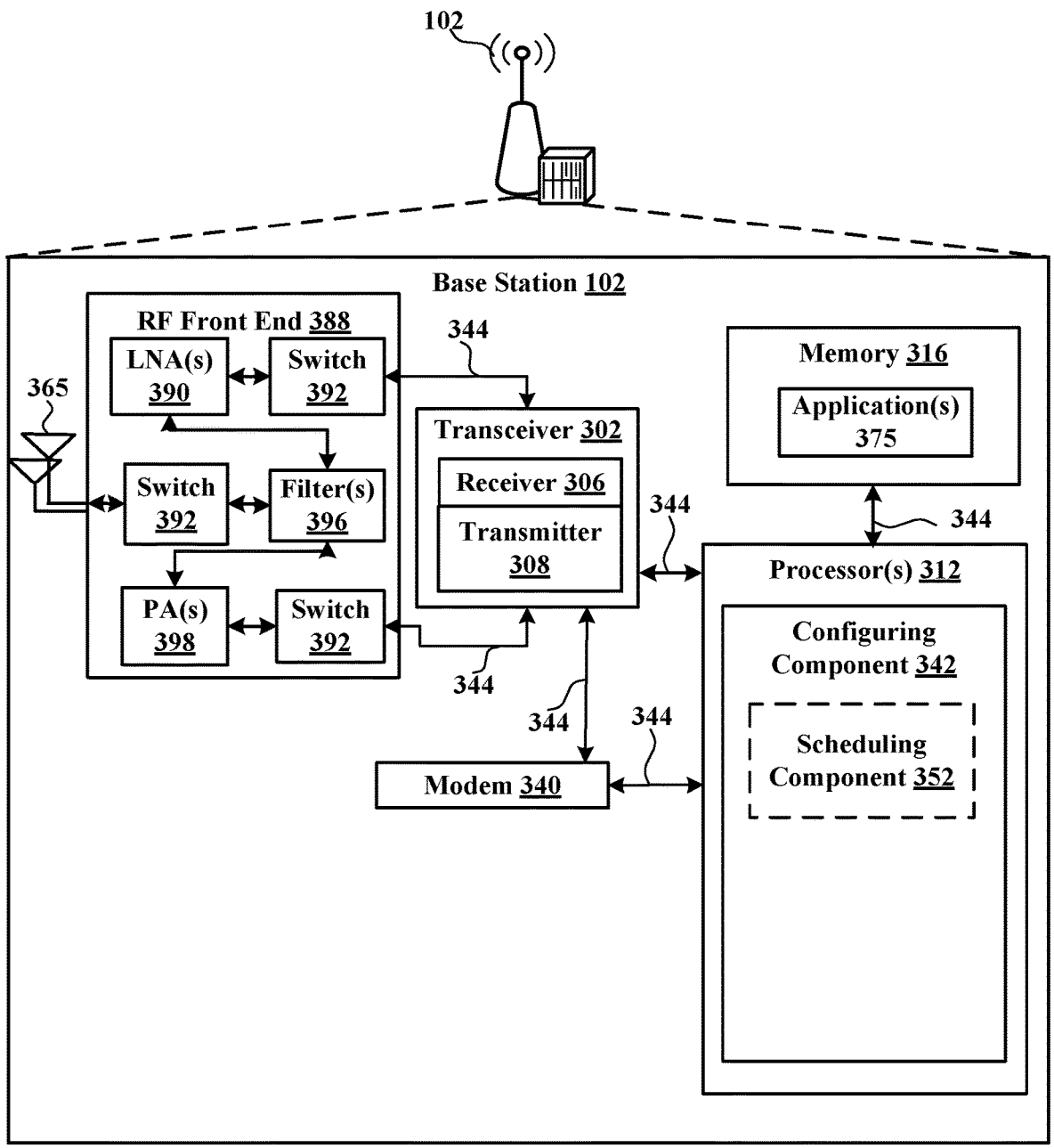
FIG. 3 is a block diagram illustrating an example of a base station, in accordance with various aspects of the present disclosure.
Figure 4:
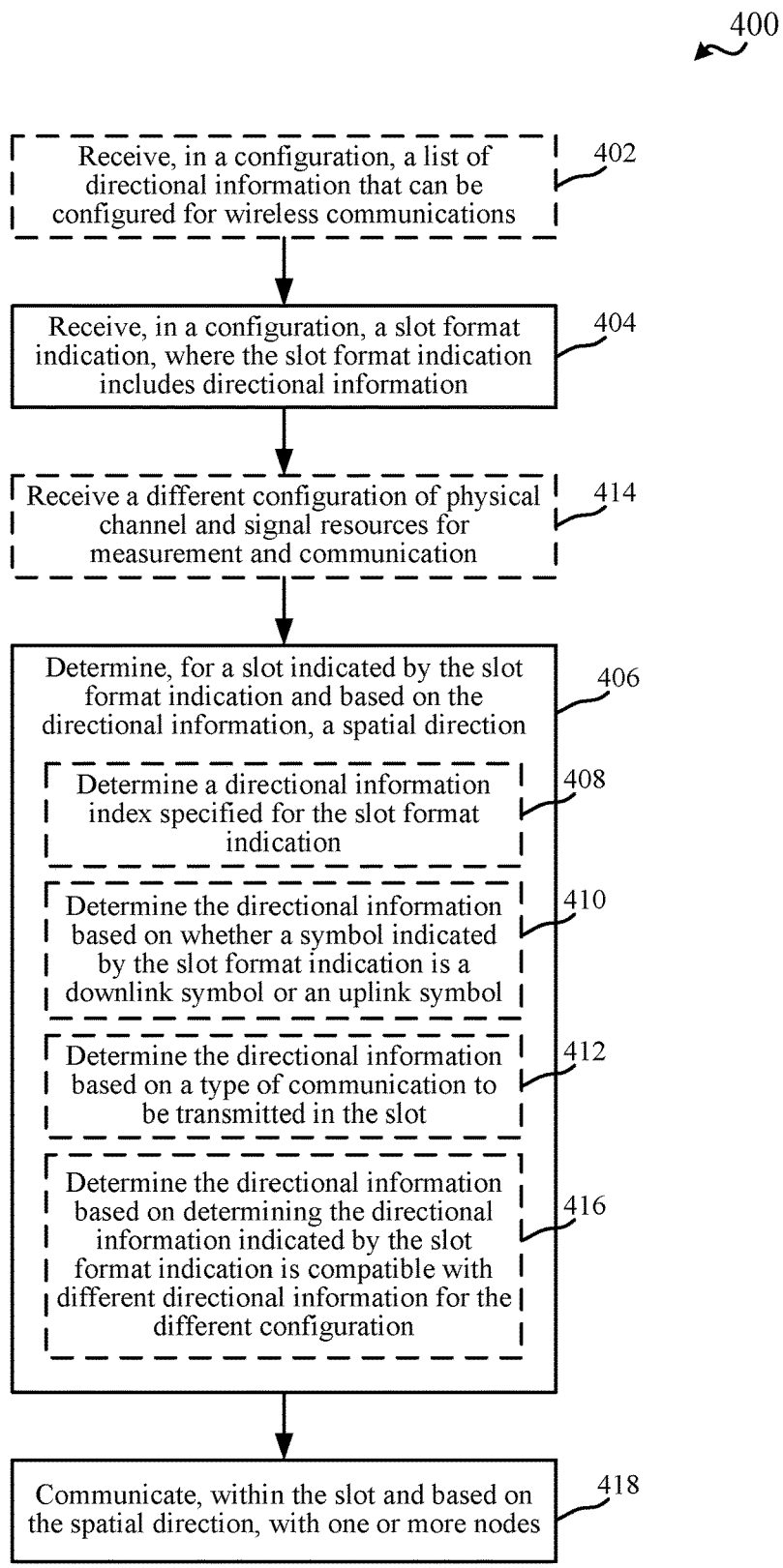
FIG. 4 is a flow chart illustrating an example of a method for determining direction information associated with time-division resources, in accordance with various aspects of the present disclosure.
Figure 5:
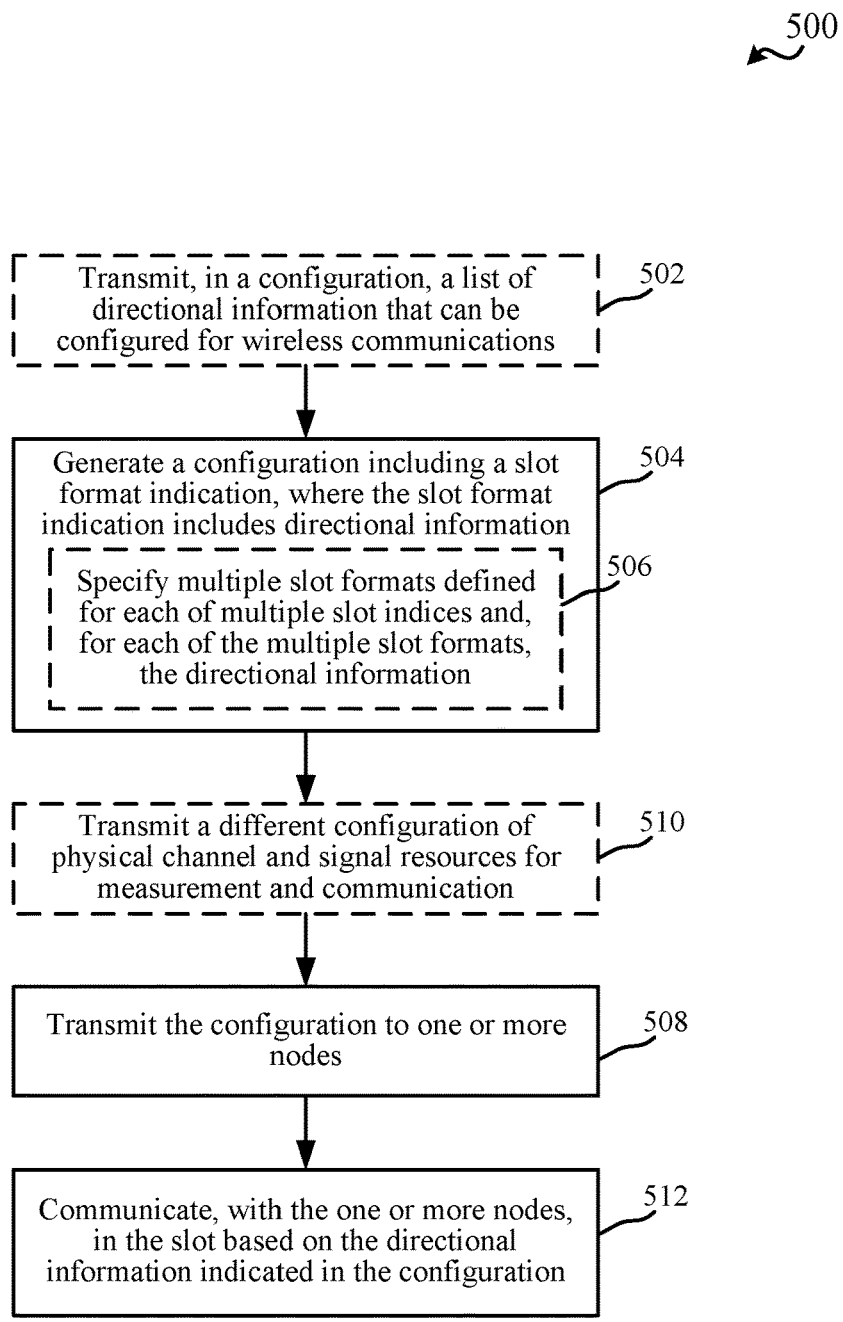
FIG. 5 is a flow chart illustrating an example of a method for configuring direction information for time-division resources, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining directional information to be applied for transmitting or receiving communications in a time-division, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a resource determining component 252 for determining whether time-division resources are for downlink, uplink, flexible, etc. communications, and/or a direction component 254 for determining to apply to communications in the time-division resources, as described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring time-division resources for a UE and/or directional information to be applied for transmitting and/or receiving communications in the time-division resources, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a scheduling component 352 for scheduling communications over time-division resources, as described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for determining directional information for communications in time-division resources. FIG. 5 illustrates a flow chart of an example of a method 500 for configuring directional information for communications in time-division resources. Methods 400 and 500 are described in conjunction with one another for ease of explanation, though the methods 400 and 500 are not required to be performed in conjunction. In an example, a UE (e.g., UE 104) can perform the functions described in method 400 using one or more of the components described in FIGS. 1 and 2 and/or a base station 102 can perform the functions described in method 500 using one or more of the components described in FIGS. 1 and 3.

In method 400, optionally at Block 402, a list of directional information that can be configured for wireless communications can be received in a configuration. In an aspect, direction component 254, e.g., in conjunction with processor(s) 212, memory 216, transceiver 202, communicating component 242, etc., can receive, in the configuration, the list of directional information that can be configured for wireless communication. For example, direction component 254 can receive the list of directional information from another node, such as a base station 102 (e.g., in broadcast signaling, such as an RRC configuration). In an example, the list of directional information may identify various instances of directional information and an associated index or other identifier, which can make configuration of directional information more efficient by allowing a configuring node to specify directional information using the index or other identifier.

In one example, direction component 254 may receive the list of directional information as a list of beamforming matrices or other information from which beamforming direction can be determined. In another example, direction component 254 may receive the list of directional information as a list of TCI states or spatial relation indicators (SRIs) configured for the UE 104. In this example, direction component 254 may determine beamforming based on received reference signals that are correlated with the TCI states or SRIs, as a list of SSBs, sounding reference signals (SRSs), etc., or based on the received SSB or SRS, etc. In these examples, where direction component 254 receives an index or identifier for directional information, direction component 254 can determine the directional information based on the index or identifier and the associated beamforming matrix, TCI state or SRI, SSB, SRS, etc. indicated in the list of directional information. In another example, direction component 254 can determine the directional information from information stored in a memory 216 of the UE 104 (e.g., where the directional information is standardized for all UEs communicating using a certain wireless communication technology, such as 5G NR). In an example, the list of directional information can be a table having a format similar to the following:

| Index | DL/UL directional information |
|---|---|
| 0 | $TCI_{0,0}, TCI_{0,1}, \ldots, SRI_{0,1}, SRI_{0,2}, \ldots$ |
| 1 | $TCI_{1,0}, TCI_{1,1}, \ldots, SRI_{1,1}, SRI_{1,2}, \ldots$ |
| 2 | $TCI_{2,0}, TCI_{2,1}, \ldots, SRI_{2,1}, SRI_{2,2}, \ldots$ |
| ... | ... |

In this example, each row of the table includes one or more TCI states and/or SRI, selected from the UE specifically configured sets of TCI states and/or SRI. In any case, where direction component 254 receives a list of directional information, in this regard, it can determine directional information to be applied to communications based on an index received related to the communications (e.g., related to a time-division of the communications, as described further herein).

In method 500, optionally at Block 502, a list of directional information that can be configured for wireless communications can be transmitted in a configuration. In an aspect, configuring component 342, e.g., in conjunction with processor(s) 312, memory 316, transceiver 302, etc., can transmit, in the configuration, the list of directional information that can be configured for wireless communications. For example, configuring component 342 can transmit the list of directional information as the list of beamforming matrices, the list of TCI states or SRIs, the list of SSBs, SRSs, etc., and/or the like. In another example, configuring component 342 can transmit the list of directional information to include an index and associated directional information (e.g., as in the table format shown above, or a similar format). For example, as described, configuring component 342 can transmit the list of directional information in RRC or other signaling to the UE 104. In this example, direction component 254 may receive the configuration, as described above.

In method 400, at Block 404, a slot format indication can be received, in a configuration, where the slot format indication includes directional information. In an aspect, resource determining component 252, e.g., in conjunction with processor(s) 212, memory 216, transceiver 202, communicating component 242, etc., can receive, in the configuration, the slot format indication, where the slot format indication includes directional information. For example, the slot format indication can indicate a format for a slot for wireless communications, which can include indicating whether symbols in the slot are downlink symbols for downlink communications, uplink symbols for uplink communications, flexible symbols for configuration for downlink or uplink communications, etc. The slot format indication can be received periodically and may include the directional information to allow for specifying different directional information for a period of time (e.g., a number of slots) based on changes in the wireless environment (e.g., mobility of the UE, introduction of an interfering node or structure, etc.).

In 5G NR, for example, receiving the slot format indication can include the resource determining component 252 receiving a slot format indication in semi-static radio resource control (RRC) signaling (which can be cell-specific or UE-specific) or in dynamic slot format indicator (SFI) specified in a group-common (GC) physical downlink control channel (PDCCH). In addition, as dynamic SFI may update the semi-static configuration, 5G NR specifies rules for overwriting the semi-static configuration with SFI, which may include a rule that only flexible resources in semi-static assignment can be overwritten to downlink or uplink symbols by SFI, or a rule that if flexible resources in semi-static assignment are not overwritten to downlink or uplink by SFI or not dynamically scheduled by PDCCH, the UE does not transmit or receive ant signal on the resources (e.g., the UE can remain in a power saving mode with reduced power to communication resources). For dynamic SFI in 5G NR, a slot format table is defined where each entry (each row in the table) indicates a potential format of a single slot identified by a slot index. Each slot format combination (SFC) table can be UE-specifically configured by RRC signaling.

Each entry of the SFC table can include a single slot format or a sequence (e.g., for multi-slot indication) of single slot formats, each of which is defined in the slot format table. In 3GPP technical specification (TS) 38.213, the slot format table is defined where each entry (each row in the table) indicates a format of a single slot identified by an index. The format of the single slot can include an indication, for each symbol in the slot, of whether the symbol is downlink, uplink, or flexible. In an example, the SFC table can indicate the single slot format(s) as a collection of indices into the slot format table, where the slot format table can be known or otherwise configured at each of the UE and base station (or other nodes for which communications are being configured). In addition, in an example, a GC-PDCCH can indicate an entry index within the SFC table (slot format indicator) to indicate a slot format to be used.

According to examples described herein, for each element of the SFC table, directional information (e.g., row index in the directional information table) can be added, such that each element of the SFC table can include one slot format information (row index in the slot format table described above) and one directional information (row index in the directional information table described above). Thus, for a given slot, as described further herein, resource determining component 252 can determine a format of the slot (e.g., based on GC-PDCCH and/or determining the slot format associated with an index indicated in GC-PDCCH or other configuration), and direction component 254 can determine the directional information indicated for the slot based on the additional directional information in the SFC table (e.g., for the index indicated in GC-PDCCH or other configuration). A specific example of a SFC table with directional information may be of the following format:

| SFI | Slot index | | | | |
|---|---|---|---|---|---|
| | 0 | 1 | 2 | ... | 255 |
| 0 | $S_{0,0}, D_{0,0}$ | $S_{0,0}, D_{0,1}$ | $S_{0,2}, D_{0,2}$ | | . |
| 1 | $S_{1,0}, D_{1,0}$ | $S_{1,1}, D_{1,1}$ | . | | . |
| ... | | | | | |
| 511 | . | . | . | | . | where S is an index into the slot format table and D is an index into the directional information table described above. According, for a given slot and a given SFI, resource determining component 252 can determine the slot format based on the index S into the slot format table and direction component 254 can determine directional information based on the index D into the directional information table.

In method 500, at Block 504, a configuration including a slot format indication can be generated, where the slot format indication includes directional information. In an aspect, configuring component 342, e.g., in conjunction with processor(s) 312, memory 316, transceiver 302, etc., can generate the configuration including the slot format indication, where the slot format indication includes directional information. For example, configuring component 342 can generate the configuration to indicate directional information for one or more slots or other time-divisions, which can include identifying a slot or time-division along with an indication of directional information to be used in communicating during the slot or other time-division.

In an example, in generating the configuration at Block 504, optionally at Block 506, multiple slot formats defined for each of multiple slot indices and, for each of the multiple slot formats, the directional information can be specified. In an aspect, configuring component 342, e.g., in conjunction with processor(s) 312, memory 316, transceiver 302, etc., can specify multiple slot formats defined for each of multiple slot indices and, for each of the multiple slot formats, directional information. For example, as described above, configuring component 342 can generate the configuration as a SFC table that includes the directional information (e.g., as an index into a directional information table) per slot in the SFC table, as described above.

In a specific example, in generating the configuration as described herein, configuring component 342 can tag slot format with additional directional information. Directional information may indicate that the resource can only be used for communication in a certain spatial direction (e.g., based on one or more specific beams). Directional information may include a set of one or more TCI states (CSI-RS index), SSB index, SRS index, etc. Directional information tag may be applied at least for 'downlink' and 'uplink' among 'downlink', 'uplink', and 'flexible' symbols or slots (or other time division resources). For each DL resource, for example, a set of TCI states and/or SSB index can be tagged. For each UL resource, for example, a set of SRS index (UL beam) or associated DL beam (same as DL resource: TCI or SSB index) can be tagged. Directional information tag may be applied for semi-static slot format configuration (e.g., as indicated in RRC signaling), or dynamic slot format indication (e.g., as indicated in (GC-PDCCH, SFI, etc.). Directional information for slot format can be configured for a UE with higher layer signaling (e.g., L1/L2 signaling (DCI or MAC CE) can also be configured for fast reconfiguration). Directional information can be applied for different units of resources, such as per symbol (each element in the slot format table) and/or per slot (each row in the slot format table), or per combination (each row in slot format combination table). In addition, for example, "All" or "No" directional information can also be used for some resources, at least for non-direction-specific communication, or for measurement of SSB or reference signals, as described further herein.

In any case, in method 500, at Block 508, the configuration can be transmitted to one or more nodes. In an aspect, configuring component 342, e.g., in conjunction with processor(s) 312, memory 316, transceiver 302, etc., can transmit the configuration to one or more nodes. For example, configuring component 342 can transmit the configuration to a UE 104, as described, which can use the configuration to determine directional information for communication in the slot/time-division, as described above and further herein.

In method 400, at Block 406, a spatial direction can be determined for a slot indicated by the slot format indication and based on the directional information. In an aspect, direction component 254, e.g., in conjunction with processor(s) 212, memory 216, transceiver 202, communicating component 242, etc., can determine, for the slot indicated by the slot format indication and based on the directional information, the spatial direction. For example, direction component 254 can determine the slot for communicating with one or more nodes, and determine the slot format indication based on the slot (e.g., based on an index of the slot relative to another slot or period of time). The slot format indication can include a list of slot formats, such as an SFC table, and the index of the slot can be used to determine the slot format based on the SFC table. The SFC table can also include directional information for the slot, and direction component 254 can accordingly determine the directional information for the slot. As described, for example, the directional information can indicate the spatial direction for transmitting and/or receiving signals, such as a beamforming matrix, a TCI state or SRI, a SSB, SRS, etc. (e.g., for reciprocal beam determination), and/or the like. In addition, in an example, the directional information may be indicated per symbol of the slot or other granularity, and direction component 254 can determine the directional information for a given symbol within the slot.

In one example, in determining the spatial direction at Block 406, optionally at Block 408, a directional information index specified for the slot format indication can be determined. In an aspect, direction component 254, e.g., in conjunction with processor(s) 212, memory 216, transceiver 202, communicating component 242, etc., can determine the directional information index specified for the slot format indication. For example, the slot format indication may include the directional information index (e.g., in the SFC table, as described above). The index may be an index into a list or table of directional information, as described above, and the directional information associated with the index can be accordingly determined.

In one example, in determining the spatial direction at Block 406, optionally at Block 410, the directional information can be determined based on whether a symbol indicated by the slot format indication is a downlink symbol or an uplink symbol. In an aspect, direction component 254, e.g., in conjunction with processor(s) 212, memory 216, transceiver 202, communicating component 242, etc., can determine the directional information based on whether the symbol indicated by the slot format indication is a downlink symbol or an uplink symbol. In one example, the directional information specified with the slot format indication may specify different directional information for downlink and uplink communications. In another example, direction component 254 can use different directional information to determine the spatial direction for downlink communications and uplink communications. For example, direction component 254 can determine to use directional information associated with TCI states or SSB index (as specified in the slot format indication) for downlink communications and can use directional information associated with SRS index (as specified in the slot format indication) or as reciprocal for associated downlink beams (e.g., TCI states or SSB index) for uplink communications.

In addition, in this example, direction component 254 can determine to use direction information for symbols determined to be downlink or uplink (e.g., but may not use direction information for symbols determined to be flexible).

In one example, in determining the spatial direction at Block 406, optionally at Block 412, the directional information can be determined based on a type of communication to be communicated in the slot. In an aspect, direction component 254, e.g., in conjunction with processor(s) 212, memory 216, transceiver 202, communicating component 242, etc., can determine the directional information based on a type of communication to be communicated in the slot (or a symbol thereof). For example, direction component 254 can determine to use direction information for certain types of communication, which may not include communications indicated as non-direction-specific or communications for measuring SSB or reference signals, etc.

In another example, in method 400, optionally at Block 414, a different configuration of physical channel and signal resources for measurement and communication can be received. In an aspect, resource determining component 252, e.g., in conjunction with processor(s) 212, memory 216, transceiver 202, communicating component 242, etc., can receive the different configuration of physical channel and signal resources for measurement and communication. For example, resource determining component 252 can receive the different configuration including a control resource set (CORESET) and/or search space set (frequency and time resources) for DL control information (e.g., PDCCH), an indication of physical uplink control channel (PUCCH) and/or configured grant physical uplink shared channel (CG-PUSCH) resources for UL control and data, random access channel (RACH) resources, semi-persistent scheduling (SPS)-physical downlink shared channel (PDSCH) resources for DL data, periodic/semi-persistent channel state information reference signals (CSI-RS) and/or SRS for DL/UL measurement, dynamic grant or triggering of PDSCH and/or PUSCH resources, aperiodic CSI-RS and/or SRS, etc. One or more of the different configurations may also have associated directional information (e.g., specified in the different configuration or elsewhere).

In this example, in determining the spatial direction at Block 406, optionally at Block 416, the directional information can be determined based on determining the direction information indicated by the slot format indication is compatible with different directional information for the different configuration. In an aspect, direction component 254, e.g., in conjunction with processor(s) 212, memory 216, transceiver 202, communicating component 242, etc., can determine the directional information based on determining the direction information indicated by the slot format indication is compatible with different directional information for the different configuration. This can include determining that the direction information is the same as, or at least similar to, the different direction information. For example, even on "DL" resources, if the TCI state associated with the CORESET is not a part of the directional information tagged with the DL resources, UE 104 may determine to not monitor PDCCH in the CORESET. In another example, even on "UL" resources, if the spatial relation information associated with the PUCCH is not a part of the directional information tagged with the UL resources, UE 104 may determine to not transmit PUCCH. In another example, if there is no intersection between the active TCI state set if the set of TCI states in the directional info, UE 104 may determine to not monitor the DL.

In another example, in method 500, optionally at Block 510, a different configuration of physical channel and signal resources for measurement and communication can be transmitted. In an aspect, scheduling component 352, e.g., in conjunction with processor(s) 312, memory 316, transceiver 302, configuring component 342, etc., can transmit the different configuration of physical channel and signal resources for measurement and communication, as described above.

In method 400, at Block 418, one or more nodes can be communicated with within the slot and based on the spatial direction. In an aspect, communicating component 242, e.g., in conjunction with processor(s) 212, memory 216, transceiver 202, etc., can communicate, within the slot and based on the spatial direction, with one or more nodes. For example, communicating component 242 can apply the directional information to antenna resources to achieve the spatial direction within the slot (or at least a symbol of the slot). As described, this can include beamforming resources based on the directional information to achieve the spatial direction for transmitting and/or receiving signals in the slot (or symbol(s) thereof), or for monitoring for communications, such as monitoring a search space for downlink signaling from the base station 102.

In method 500, at Block 512, one or more nodes can be communicated with within the slot and based on the directional information indicated in the configuration. In an aspect, configuring component 342, e.g., in conjunction with processor(s) 312, memory 316, transceiver 302, etc., can communicate, with one or more nodes, in the slot and based on the directional information (e.g., spatial direction) indicated in or by the configuration. For example, configuring component 342 can similarly beamform resources based on the configuration (e.g., known which directional information it indicated in the configuration for certain slots and/or symbols) to achieve the spatial direction for transmitting and/or receiving signals in the slot (or symbol(s) thereof).

Indicating directional information in slot format information can allow for determining directional information more frequently and with less overhead than semi-static or other typical configurations. For example, for SFI in mmWave systems (e.g., NR FR2), communication between BS and UE is based on beam-paired links (BPL). Transmission of SFI (GC-PDCCH) is also transmitted with beamforming. Since SFI is common for all UEs in the group, SFI may be required to be repeated over multiple beams (beam sweeping). For power saving, some other use cases of SFI can be considered, such as using a single beam at BS. In this case, BS can use a single beam at a time—for example, multiple UEs in the cell can be served based on time division multiplexing (TDM). BS can transmit SFI (GC-PDCCH) only over a certain direction. The direction and/or beams can be determined by the traffic status of UEs. The UEs not in the intended direction (i.e., UE with no traffic) may not be able to receive SFI and may cancel all DL/UL transmission/reception to save power. If a UE not in the intended direction overhears the SFI (e.g., through side-lobes or back-lobes of the beam), the UE may be able to save power. In another case, multiple beams can be used at BS. In this case, BS can use multiple beams simultaneously—for example, multiple UEs can be simultaneously served by multi-user MIMO (MU-MIMO) or space division multiplexing (SDM). BS can transmit different SFI over different directions using multiple beams. For simultaneously served UEs, more flexible resource assignment (DL/UL/Flexible) is possible. If multiple different SFI is transmitted over different directions and a UE can hear/overhear more than one SFI (e.g., through side-lobes or back-lobes of the beams), the UE may not be able to distinguish which is its own intended SFI.

To solve these potential issues, configuration of GC-PDCCH, i.e., SFI-radio network temporary identifier (RNTI), DCI format (format 2_0), CORESET, and search space set (Type3 common search space (CSS)), can be direction/beam-specific. UE can only monitor GC-PDCCH of the associated directions/beams since resources for different directions/beams are separated. Due to UE mobility, however, the directions/beams for the UE may change over time. Since the configuration of GC-PDCCH is semi-static (RRC signaling), dynamic adaptation of directions/beams for a UE may be challenging due to reconfiguration delay and overhead. In another attempt to solve these potential issues, configuration of multiple sets of SFI configuration and dynamic selection can be used. This may present additional configuration overhead, however, due to multiple sets of SFI configuration. Additionally, signaling overhead from BS, for high-mobility UEs, may be needed. Also, cross-carrier and/or cross-transmission/reception point (TRP)/BS SFI using different resource may not be possible. In carrier aggregation scenarios, FR1 (without beamforming) can deliver SFI for FR2, and in multi-TRP scenarios, one TRP can deliver its own and other TRPs' SFI.

Indicating directional information in slot format information, as described above however, can cure such potential issues associated with GC-PDCCH SFI and configuration of multiple sets of SFI.

Figure 6:
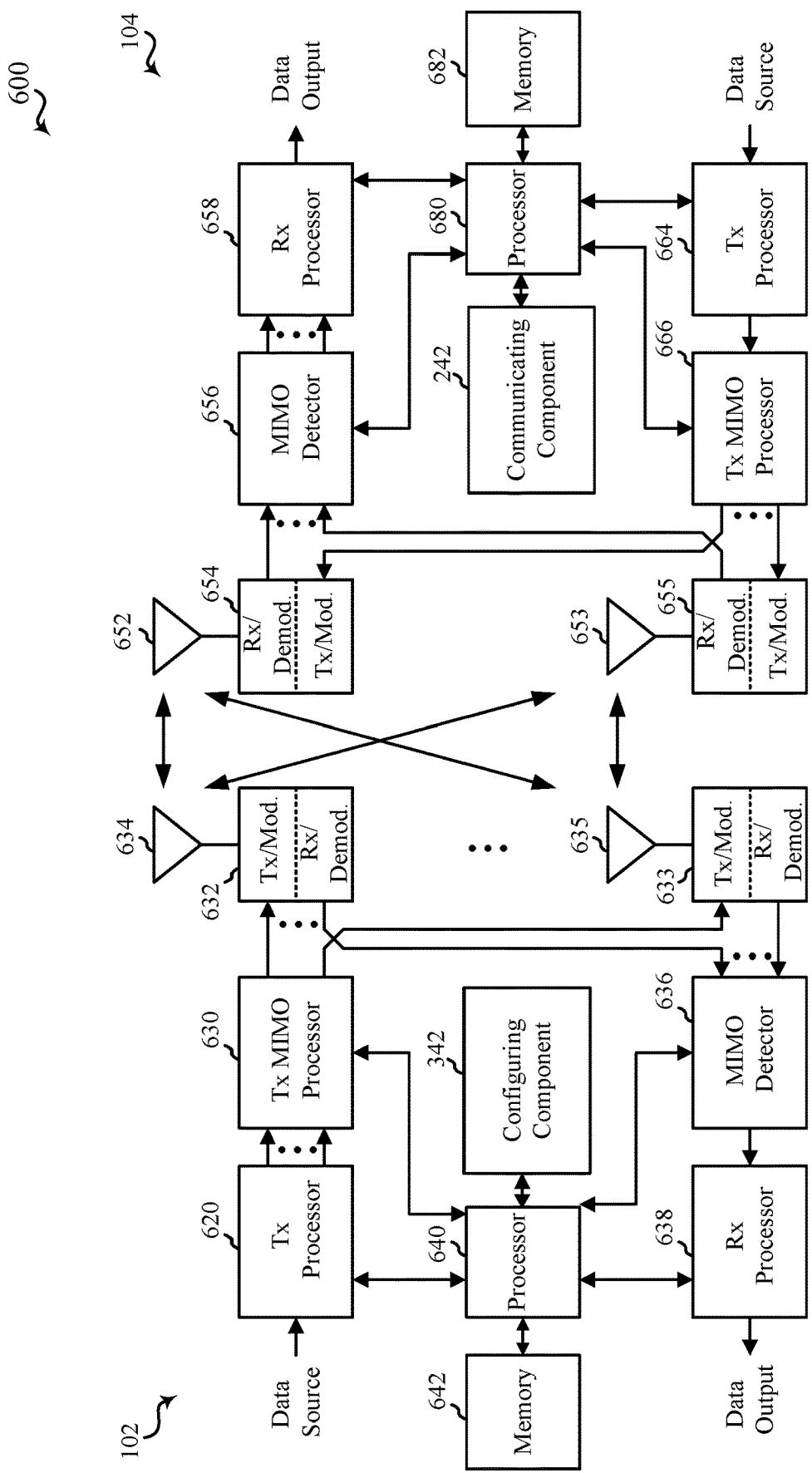
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104, in accordance with various aspects of the present disclosure. The MIMO communication system 600 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The following aspects are illustrative only and aspects thereof may be combined with aspects of other embodiments or teaching described herein, without limitation.

Aspect 1 is a method of wireless communication, including receiving, in a configuration, a slot format indication, wherein the slot format indication includes directional information indicating spatial directions associated with communications based on the slot format, determining, for a slot indicated by the slot format indication and based on the directional information, the spatial direction, and communicating, within the slot and based on the spatial direction, with one or more nodes.

In Aspect 2, the method of Aspect 1 includes wherein the configuration specifies multiple slot formats defined for each of multiple slot indices, and wherein the configuration specifies, for each of the multiple slot formats, the directional information.

In Aspect 3, the method of Aspect 2 include wherein the directional information includes a directional information index into a list of directional information, and wherein determining the spatial direction is based at least in part on determining the directional information based on the directional information index and the list.

In Aspect 4, the method of any of Aspects 2 or 3 include wherein the configuration specifies the directional information per symbol of a given slot, per slot, or per set of multiple slots.

In Aspect 5, the method of any of Aspects 1 to 4 include wherein the directional information includes at least one of one or more transmission configuration indicator (TCI) states or spatial relation indicators (SRIs), a synchronization signal block (SSB) index, a sounding reference signal (SRS) index.

In Aspect 6, the method of Aspect 5 includes wherein determining the directional information is based on whether a symbol indicated by the slot format indication is a downlink symbol or an uplink symbol.

In Aspect 7, the method of Aspect 6 includes wherein the directional information includes, for downlink symbols, the one or more TCI states or the SSB index, and, for uplink symbols, the SRS index or associated downlink beams.

In Aspect 8, the method of any of Aspects 1 to 7 include wherein receiving the configuration comprises receiving at least one of a slot format configuration in radio resource control (RRC) signaling, a group control channel or slot configuration indicator in dynamic signaling, downlink control information (DCI), or media access control (MAC) control element (CE).

In Aspect 9, the method of any of Aspects 1 to 8 include determining a type of communications, and wherein communicating comprises communicating, within the symbol, based on the spatial direction, and based on the type of communications, with the one or more nodes.

In Aspect 10, the method of any of Aspects 1 to 9 include receiving a different configuration of physical channel and signal resources for measurement and communication, wherein the different configuration includes separate directional information associated with the physical channel and signal resources, and wherein communicating comprises communicating, within the physical channel and signal resources, based on the spatial direction, and based on determining that the directional information is compatible with the separate directional information, with the one or more nodes.

In Aspect 11, the method of Aspect 10 includes wherein the different configuration includes one or more of a control resource set (CORESET), a physical uplink control channel (PUCCH) and/or configured grant resources for uplink control and data, a random access channel (RACH) configuration, a semi-persistent scheduling (SPS) grant, a channel state information reference signal (CSI-RS) configuration, a sounding reference signal (SRS) configuration, or a dynamic grant of downlink resources.

Aspect 12 is a method of wireless communication including generating a configuration including a slot format indication, wherein the slot format indication includes directional information indicating spatial directions associated with communications based on the slot format, transmitting the configuration to one or more nodes, and communicating, with the one or more nodes, wireless communications in a slot based on the directional information indicated in the configuration.

In Aspect 13, the method of Aspect 12 includes wherein generating the configuration comprises specifying multiple slot formats defined for each of multiple slot indices, and specifying, for each of the multiple slot formats, the directional information.

In Aspect 14, the method of Aspect 13 includes wherein the directional information includes a directional information index into a list of directional information, and further comprising generating a directional information configuration including the list of directional information, wherein the list of directional information indicates the directional information and associated directional information indices.

In Aspect 15, the method of any of Aspects 13 or 14 include wherein the configuration specifies the directional information per symbol of a given slot, per slot, or per set of multiple slots.

In Aspect 16, the method of any of Aspects 12 to 15 include wherein the directional information includes at least one of one or more transmission configuration indicator (TCI) states or spatial relation indicators (SRIs), a synchronization signal block (SSB) index, a sounding reference signal (SRS) index.

In Aspect 17, the method of Aspect 16 includes wherein the directional information includes, for downlink symbols, the one or more TCI states or the SSB index, and, for uplink symbols, the SRS index or associated downlink beams.

In Aspect 18, the method of any of Aspects 12 to 17 include wherein transmitting the configuration comprises transmitting at least one of a slot format configuration in radio resource control (RRC) signaling, a group control channel or slot configuration indicator in dynamic signaling, downlink control information (DCI), or media access control (MAC) control element (CE).

In Aspect 19, the method of any of Aspects 12 to 18 include transmitting, to the one or more nodes, a different configuration of physical channel and signal resources for measurement and communication, wherein the different configuration includes separate directional information associated with the physical channel and signal resources.

In Aspect 20, the method of Aspect 19 includes wherein the different configuration includes one or more of a control resource set (CORESET), a physical uplink control channel (PUCCH) and/or configured grant resources for uplink control and data, a random access channel (RACH) configuration, a semi-persistent scheduling (SPS) grant, a channel state information reference signal (CSI-RS) configuration, a sounding reference signal (SRS) configuration, or a dynamic grant of downlink resources.

Aspect 21 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 20.

Aspect 22 is an apparatus for wireless communication, including means for performing the operations of one or more methods in any of Aspects 1 to 20.

Aspect 23 is a computer-readable medium, including code executable by one or more processors to perform the operations of one or more methods in any of Aspects 1 to 20.

What is claimed is:

1. A method of wireless communication, comprising:
receiving, in a configuration, a slot format indication indicating a slot format for communications in at least one slot and a directional information indication indicating directional information for communications in the at least one slot, wherein the slot format corresponds to communication directions for each of multiple symbols in the at least one slot as being one of downlink, uplink, or flexible, wherein the directional information corresponds to one or more spatial directions associated with communications in the at least one slot;
and
communicating, within the at least one slot and based on the slot format and the directional information, with one or more nodes.

2. The method of claim 1, wherein the configuration specifies multiple slot formats defined for each of multiple slot indices, and wherein the configuration specifies, for each of the multiple slot formats, the directional information.

3. The method of claim 1, wherein the directional information includes a directional information index into a directional information list, and wherein communicating based on the directional information includes communicating in one of the one or more spatial directions associated with the directional information index in the directional information list.

4. The method of claim 1, wherein the configuration specifies the directional information per symbol of the at least one slot, per the at least one slot, or per set of multiple slots that include the at least one slot.

5. The method of claim 1, wherein the directional information includes at least one of one or more transmission configuration indicator (TCI) states or spatial relation indicators (SRIs), a synchronization signal block (SSB) index, or a sounding reference signal (SRS) index.

6. The method of claim 5, wherein the directional information for a given symbol of the multiple symbols is based on whether the given symbol is indicated by the slot format indication as being downlink or uplink.

7. The method of claim 6, wherein the directional information indicates, for the multiple symbols indicated by the slot format indication as being downlink, the one or more TCI states or the SSB index, and, for the multiple symbols indicated by the slot format indication as being uplink, the SRS index or associated downlink beams.

8. The method of claim 1, wherein receiving the configuration comprises receiving at least one of a slot format configuration, which indicates the slot format indication, in radio resource control (RRC) signaling, a group control channel or slot configuration indicator in dynamic signaling, downlink control information (DCI), or media access control (MAC) control element (CE).

9. The method of claim 1, further comprising determining a type of communications, and wherein communicating comprises communicating, within the at least one slot, based on the slot format and the directional information, and based on the type of communications, with the one or more nodes.

10. The method of claim 1, further comprising receiving a different configuration of physical channel and signal resources for measurement and communication, wherein the different configuration includes separate directional information associated with the physical channel and signal resources, and wherein communicating comprises communicating, within the physical channel and signal resources, based on the slot format and the directional information, and based on determining that the directional information is compatible with the separate directional information, with the one or more nodes.

11. The method of claim 10, wherein the different configuration includes one or more of a control resource set (CORESET), a physical uplink control channel (PUCCH) and/or configured grant resources for uplink control and data, a random access channel (RACH) configuration, a semi-persistent scheduling (SPS) grant, a channel state information reference signal (CSI-RS) configuration, a sounding reference signal (SRS) configuration, or a dynamic grant of downlink resources.

12. A method of wireless communication, comprising:
generating a configuration including a slot format indication indicating a slot format for communications in at least one slot and a directional information indication indicating directional information for communications in the at least one slot, wherein the slot format corresponds to communication directions for each of multiple symbols in the at least one slot as being one of downlink, uplink, or flexible, wherein the directional information corresponds to one or more spatial directions associated with communications in the at least one slot;
transmitting the configuration to one or more nodes; and
communicating, with the one or more nodes, wireless communications in the at least one ft slot and based on slot format and the directional information indicated in the configuration.

13. The method of claim 12, wherein generating the configuration comprises specifying multiple slot formats defined for each of multiple slot indices, and specifying, for each of the multiple slot formats, the directional information.

14. The method of claim 12, wherein the directional information includes a directional information index into a directional information list, and further comprising generating a directional information configuration including the directional information list, wherein the directional information list indicates the directional information and associated directional information indices.

15. The method of claim 12, wherein the configuration specifies the directional information per symbol of the at least one slot, per the at least one slot, or per set of multiple slots that include the at least one slot.

16. The method of claim 12, wherein the directional information includes at least one of one or more transmission configuration indicator (TCI) states or spatial relation indicators (SRIs), a synchronization signal block (SSB) index, or a sounding reference signal (SRS) index.

17. The method of claim 16, wherein the directional information indicates, for the multiple symbols indicated by the slot format indication as being downlink, the one or more TCI states or the SSB index, and, for the multiple symbols indicated by the slot format indication as being uplink, the SRS index or associated downlink beams.

18. The method of claim 12, wherein transmitting the configuration comprises transmitting at least one of a slot format configuration, which indicates the slot format indication, in radio resource control (RRC) signaling, a group control channel or slot configuration indicator in dynamic signaling, downlink control information (DCI), or media access control (MAC) control element (CE).

19. The method of claim 12, further comprising transmitting, to the one or more nodes, a different configuration of physical channel and signal resources for measurement and communication, wherein the different configuration includes separate directional information associated with the physical channel and signal resources.

20. The method of claim 19, wherein the different configuration includes one or more of a control resource set (CORESET), a physical uplink control channel (PUCCH) and/or configured grant resources for uplink control and data, a random access channel (RACH) configuration, a semi-persistent scheduling (SPS) grant, a channel state information reference signal (CSI-RS) configuration, a sounding reference signal (SRS) configuration, or a dynamic grant of downlink resources.

21. An apparatus for wireless communication, comprising:
a transceiver;
a memory configured to store instructions; and
one or more processors communicatively coupled with the transceiver and the memory, wherein the one or more processors are configured to:
receive, in a configuration, a slot format indication indicating a slot format for communications in at least one slot and a directional information indication indicating directional information for communications in the at least one slot, wherein the slot format corresponds to communication directions for each of multiple symbols in the at least one slot as being one of downlink, uplink, or flexible, wherein the directional information corresponds to one or more spatial directions associated with communications in the at least one slot;
and
communicate, within the at least one slot and based on the slot format and the directional information, with one or more nodes.

22. The apparatus of claim 21, wherein the configuration specifies multiple slot formats defined for each of multiple slot indices, and wherein the configuration specifies, for each of the multiple slot formats, the directional information.

23. The apparatus of claim 21, wherein the directional information includes a directional information index into a directional information list, and wherein the one or more processors are configured to communicate based on the directional information at least in part by communicating in one of the one or more spatial directions associated with the directional information index in the directional information list.

24. The apparatus of claim 21, wherein the configuration specifies the directional information per symbol of the at least one slot, per the at least one slot, or per set of multiple slots that include the at least one slot.

25. The apparatus of claim 21, wherein the directional information includes at least one of one or more transmission configuration indicator (TCI) states or spatial relation indicators (SRIs), a synchronization signal block (SSB) index, or a sounding reference signal (SRS) index.

26. The apparatus of claim 25, wherein the directional information for a given symbol of the multiple symbols is based on whether the given symbol is indicated by the slot format indication as being downlink or uplink.

27. The apparatus of claim 26, wherein the directional information indicates, for the multiple symbols indicated by the slot format indication as being downlink, the one or more TCI states or the SSB index, and, for the multiple symbols indicated by the slot format indication as being uplink, the SRS index or associated downlink beams.

28. The apparatus of claim 21, wherein receiving the configuration comprises receiving at least one of a slot format configuration, which indicates the slot format indication, in radio resource control (RRC) signaling, a group control channel or slot configuration indicator in dynamic signaling, downlink control information (DCI), or media access control (MAC) control element (CE).

29. An apparatus for wireless communication, comprising:
   a transceiver;
   a memory configured to store instructions; and
   one or more processors communicatively coupled with the transceiver and the memory, wherein the one or more processors are configured to:
      generate a configuration including a slot format indication indicating a slot format for communications in at least one slot and a directional information indication indicating directional information for communications in the at least one slot, wherein the slot format corresponds to communication directions for each of multiple symbols in the at least one slot as being one of downlink, uplink, or flexible, wherein the directional information corresponds to one or more spatial directions associated with communications in the at least one slot;
      transmit the configuration to one or more nodes; and
      communicate, with the one or more nodes, wireless communications in the at least one slot based on the slot format and the directional information indicated in the configuration.

30. The apparatus of claim 29, wherein the one or more processors are configured to generate the configuration at least in part by specifying multiple slot formats defined for each of multiple slot indices, and specifying, for each of the multiple slot formats, the directional information.

* * * * *